United States Patent [19]

Aso

[11] Patent Number: 4,914,334
[45] Date of Patent: Apr. 3, 1990

[54] PERMANENT MAGNET DC MACHINE

[75] Inventor: Hiroaki Aso, Hyogo, Japan

[73] Assignee: Mitsubishi Denki Kabushiki Kaisha, Tokyo, Japan

[21] Appl. No.: 327,673

[22] Filed: Mar. 23, 1989

[30] Foreign Application Priority Data

Mar. 30, 1988 [JP] Japan .................................. 63-79133

[51] Int. Cl.$^4$ ............................................. H02K 23/04
[52] U.S. Cl. ..................................... 310/154; 310/43; 310/91; 310/258
[58] Field of Search ............... 310/152, 154, 155, 177, 310/46, 43, 258, 89, 233, 42, 91

[56] References Cited

U.S. PATENT DOCUMENTS

| | | |
|---|---|---|
| 3,594,599 | 7/1971 | West . |
| 4,458,184 | 7/1984 | Kawate . |
| 4,491,756 | 1/1985 | Tomite ................... 310/154 |
| 4,570,093 | 2/1986 | Morii et al. . |
| 4,580,072 | 4/1986 | Morishita . |
| 4,639,625 | 1/1987 | Abukawa et al. ................ 310/154 |
| 4,774,426 | 9/1988 | Mohr et al. . |
| 4,783,608 | 11/1988 | Gruber et al. . |
| 4,794,291 | 12/1988 | Abukawa et al. ................ 310/154 |

FOREIGN PATENT DOCUMENTS 0035721 10/1973 Japan .

*Primary Examiner*—R. Skudy
*Attorney, Agent, or Firm*—Sughrue, Mion, Zinn, Macpeak & Seas

[57] ABSTRACT

A permanent magnet DC machine comprising a rotor and a stator diametrically opposed to the rotor through a fine air gap therebetween. The stator comprises a yoke, main magnetic poles of anisotropic permanent magnet provided on an inner circumferential surface of the yoke and auxiliary magnetic poles provided respectively adjacent to the main magnetic poles side by side, each of the auxiliary magnetic pole being made of a material having higher reversible permeability than said permanent magnet. Each pair of the main and auxiliary magnetic poles are arranged so that they are in contact with each other at a radially inner portion of the magnetic poles and are separated from each other at a radially outer side of the magnetic poles to thereby form a magnetic leakage-path breaking air gap portion therebetween. A circumferential length of the air gap portion at the radially outer side is larger than a radial distance of said fine air gap and a nonmagnetic member is provided in the air gap portion to prevent the leakage of magnetic flux.

8 Claims, 4 Drawing Sheets

PERMANENT MAGNET DC MACHINE

BACKGROUND OF THE INVENTION

The present invention relates to a permanent magnet DC machine, and more particularly relates to a permanent magnet DC machine having a stator provided with main magnetic poles of anisotropic permanent magnets and auxiliary magnetic poles having higher reversible permeability than that of the permanent magnets and arranged side by side with the main magnetic poles.

Conventionally, a permanent magnet DC machine including a stator or the like, is provided with auxiliary magnetic poles of soft iron or the like on the magnetism-increasing side as a countermeasure against demagnetization due to an armature reaction as taught in Japanese Patent Examined Publication No. 35721/73. That is, there have been proposed an arrangement of a permanent magnet DC machine in which main magnetic poles of anisotropic permanent magnets having their opposite ends cut parallelly to center lines extended radially from the center of a rotor and auxiliary magnetic poles of soft iron or the like are provided so as to be adjacent to one another through circumferential air gaps, respectively; and another arrangement of a permanent magnet DC machine in which main magnetic poles and auxiliary magnetic poles are provided so as to be adjacent to one another with their facing surfaces being in close contact with each other.

It has been well known that the magnetic flux of the anisotropic permanent magnet passes through a rotor in the radial direction thereof. Accordingly, in the case where the auxiliary magnetic pole is arranged adjacent to the main magnetic pole of the anisotropic permanent magnet so that they are in close contact with each other at their entire facing surfaces in the circumferential direction of a stator (that is, the rotational direction of a rotor), a leakage magnetic path is formed between those magnetic poles. Therefore, in such a permanent magnet DC machine in which the entire facing end surfaces of the main and auxiliary magnetic pole are in close contact with each other, the effective magnetic flux is reduced to thereby reduce the rotary torque of the machine.

On the other hand, in such a permanent magnet DC machine in which an auxiliary magnetic pole is arranged adjacent to a main magnetic pole of an anisotropic permanent magnet through an air gap in the circumferential direction of the stator (the rotational direction of the rotor), leakage magnetic flux is reduced. However, there is a problem in that since an air gap is formed between each pair of main and auxiliary magnetic poles over the full length of the stator, the magnetic flux distribution waveform viewed from the armature side of the rotor drops sharply between the main and auxiliary magnetic poles at the time of high load, so that smooth driving becomes difficult, the output becomes lower, and magnetic sound and/or mechanical vibrations are generated. There is a further problem in that the formation of an air gap between each pair of main and auxiliary magnetic poles makes it difficult to place the main and auxiliary magnetic poles in position, resulting in poor assembling property.

SUMMARY OF THE INVENTION

In order to solve the problems in the prior art as described above, it is an object of the present invention to provide a permanent magnet DC machine in which a magnetic flux distribution waveform is smooth, rotary torque can be improved, and assembling property is preferable.

In order to attain the above objects, the permanent magnet DC machine according to the present invention comprises a rotor and a stator diametrically opposed to the rotor through a fine air gap therebetween, wherein the stator has a yoke, main magnetic poles provided on an inner circumferential surface of the yoke and auxiliary magnetic poles provided respectively adjacent to the main magnetic poles side by side. Each of the main magnetic poles is made of an anisotropic permanent magnet, and each of the auxiliary magnetic pole is made of a material having higher reversible permeability than the permanent magnet; and each pair of the main and auxiliary magnetic poles disposed adjacent to each other being arranged so as to be in contact with each other at a radially inner side of the magnetic poles and so as to be separated from each other at a radially outer side of the magnetic poles, to thereby form a magnetic leakage-path breaking air gap portion between the each pair of main and auxiliary magnetic poles. The magnetic leakage-path breaking air gap portion is established so that a circumferential length thereof at the radially outer side is larger than a radial distance of the fine air gap and a nonmagnetic member is provided in the magnetic leakage-path breaking air gap portion.

Preferably, the nonmagnetic member includes a resin member and is formed so as to arrange the main magnetic poles and the auxiliary magnetic poles in position.

Preferably, guides are provided at axially opposite end portions of the nonmagnetic member so as to receive end surfaces of the each pair of main and auxiliary magnetic poles to thereby dispose the main and auxiliary magnetic poles in position.

According to the present invention, since the magnetic leakage path between the main and auxiliary magnetic poles in each pair is broken by the nonmagnetic member provided in the magnetic leakage path breaking air gap portion, the leakage magnetic flux is reduced, and since the main and auxiliary magnetic poles in each pair are arranged so as to be in contact with each other at the radially inner side, the magnetic flux distribution waveform is smooth without dropping sharply between the main and auxiliary magnetic poles in each pair.

DETAILED DESCRIPTION OF THE PREFERRED EMBODIMENTS

Figure 1:
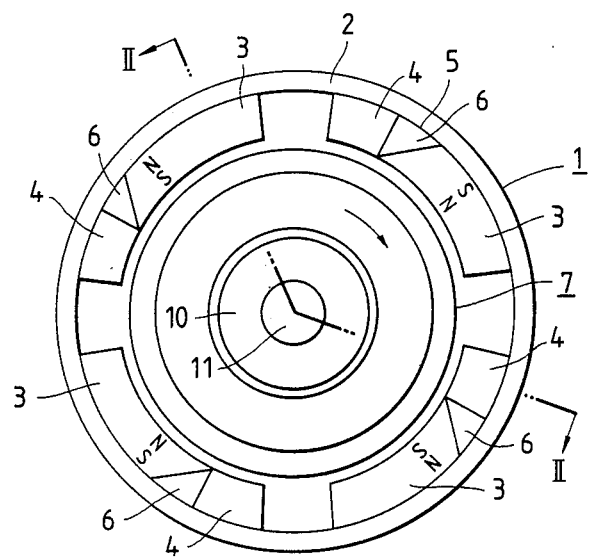
FIG. 1 is a front view showing a first embodiment of the permanent magnet DC machine according to the present invention.
Figure 2:
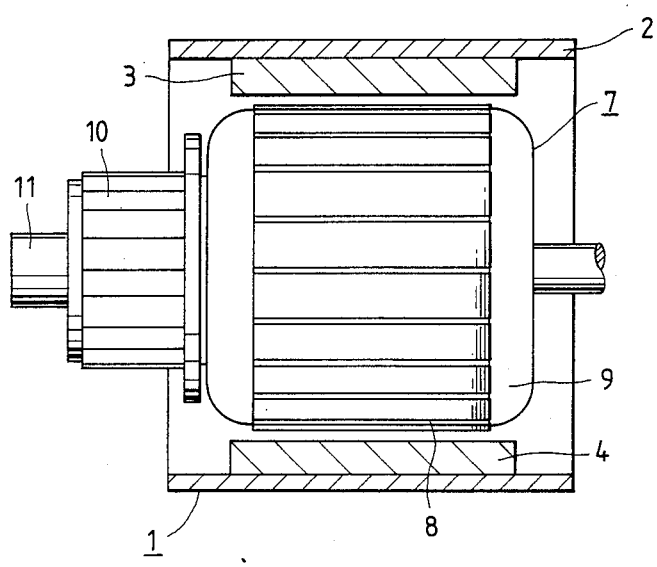
FIG. 2 is a sectional view taken on line II—II in FIG. 1.

Preferred embodiments of the permanent magnet DC machine according to the present invention will be described hereunder with reference to the accompanying drawings.

FIGS. 1 through 4 illustrate a first embodiment of the permanent magnet DC machine according to this invention. A stator 1 comprises a yoke 2 made of a magnetic material such as iron or the like, four main magnetic poles 3 made of anisotropic permanent magnets, and four auxiliary magnetic poles 4 made of soft iron or the like having higher reversible permeability than that of the permanent magnets of the main magnetic poles 3. The four main magnetic poles 3 are fixed circumferentially equidistantly on the inner circumferential surface of the yoke 2 through an adhesive or the like in such a manner that any two magnetic poles adjacent to each other are magnetized in different polarity from each other. The four auxiliary magnetic poles 4 are provided so as to be adjacent to the four main magnetic poles respectively to thereby form four pairs of main and auxiliary magnetic poles. The main and auxiliary magnetic poles in each pair are arranged so as to be circumferentially in contact with each other at the radially inner side thereof and circumferentially separated from each other at the radially outer side thereof, thereby a forming magnetic leakage-path breaking air gap portion 5 between the main and auxiliary magnetic poles 3 and 4. In the magnetic leakage-path breaking air gap portion 5, the circumferential length b of the gap portion 5 at the radially outer side is made to be larger than the radial distance a of the fine air gap between the stator 1 and a rotor 7, which will be described later. Four nonmagnetic members 6 comprising resin members are provided in the air gap portions 5 respectively. The rotor 7 is provided so as to be diametrically in opposition to the inner circumference of the four pairs of main and auxiliary magnetic poles 3 and 4 through the above-mentioned fine air gap b, and arranged so as to be rotatable clockwise, that is, in the direction indicated by an arrow. The rotor 7 comprises an armature core 8 confronting the four pairs of main and auxiliary magnetic poles 3 and 4 through the air gap a, an armature coil 9 wound around the armature core 8, a commutator 10, and an armature shaft 11.

Figure 3:
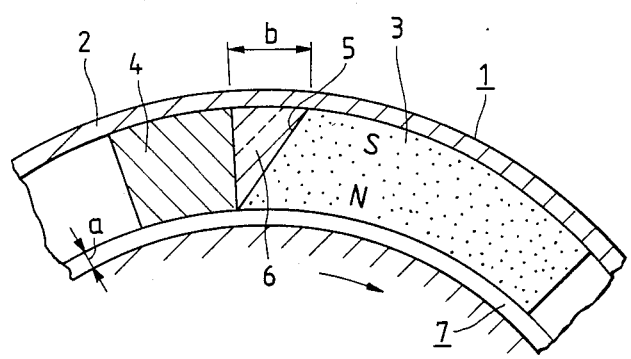
FIG. 3 is a sectional view showing a main portion of the embodiment of FIG. 1.
Figure 4:
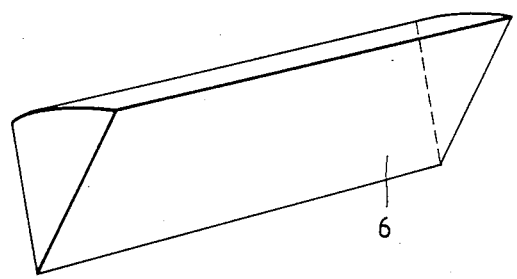
FIG. 4 is a perspective view showing the nonmagnetic member in the embodiment of FIG. 1.

In the permanent magnet DC machine thus arranged, the stator 1 is assembled as follows. First, the four auxiliary magnetic poles 4 are fixed on the inner circumferential surface of the yoke 2 by means of welding or the like. Next, the four nonmagnetic members 6 are fixed on the inner circumferential surface of the yoke 2 through an adhesive in such a manner that the four nonmagnetic members 6 are in contact with the auxiliary magnetic poles 4, respectively. Then, the four main magnetic poles 3 are mounted in position on the inner circumferential surface of the yoke 2 with the respective right end surfaces of the nonmagnetic members 6 as a reference as shown in FIG. 3, and are fixedly bonded to the inner circumferential surface of the yoke 2 and the right end surfaces of the nonmagnetic members 6 through an adhesive or the like. The rotor 7 is then mounted along the inner circumference of the thus arranged stator 1 so that the air gap a is formed between the armature core 8 and the four pairs of main and auxiliary magnetic poles 3 and 4.

Figure 5:
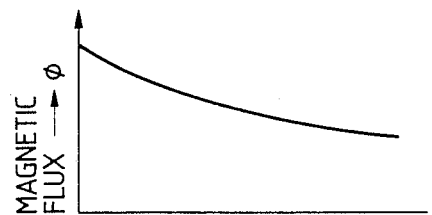
FIG. 5 is a waveform diagram showing magnetic flux distribution in the embodiment of FIG. 1.
Figure 5:
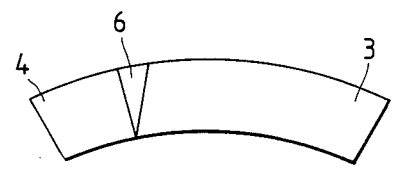

As described above, in this embodiment, the magnetic leakage-path breaking air gap portions 5 each having a circumferential length b which is selected to be larger than the radial distance of the fine air gap a and the nonmagnetic members 6 are provided in the air gap portions 5 respectively. Accordingly, the magnetic leakage-path between the main and auxiliary magnetic poles 3 and 4 in each pair is broken by the nonmagnetic member 6, so that leakage magnetic flux is extremely reduced, resulting in improvement of rotary torque. Further, the main and auxiliary magnetic poles 3 and 4 in each pair are made in contact with each other at their radial inner side so as not to form any circumferential gap on their inner circumference opposed to the rotor 7, so that the magnetic-flux distribution waveform is made smooth as shown in FIG. 5. Accordingly, the output can be improved, and the generation of magnetic sound and mechanical vibrations can be prevented. The nonmagnetic members 6 can be used for positioning the main magnetic poles 3 so that the assembling work is made easy.

Figure 6:
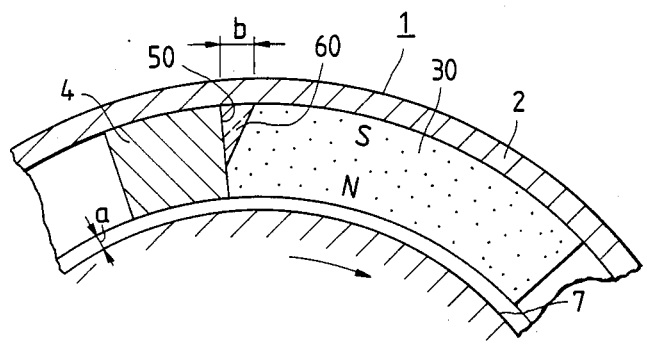
FIG. 6 is a sectional view showing a second embodiment of the permanent magnet DC machine according to the present invention.
Figure 7:
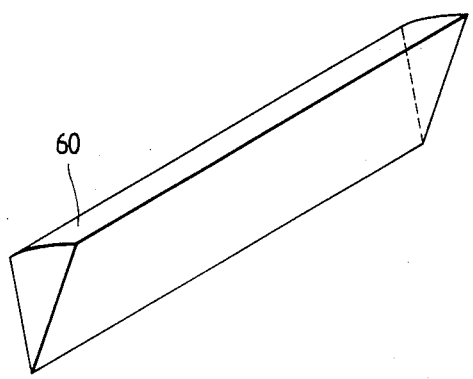
FIG. 7 is a perspective view showing the nonmagnetic member in the embodiment of FIG. 6.

Although the vertex of each magnetic leakage-path breaking air gap portion 5 is elongated in the radial direction substantially so as to reach the radially inner end of the stator 1 to thereby make the nonmagnetic members 6 relatively large-sized in the embodiment, the nonmagnetic members 6 may be formed in such a manner as shown in FIGS. 6 and 7.

FIGS. 6 and 7 illustrate a second embodiment of this invention. In FIGS. 6 and 7, each main magnetic pole 30 of an anisotropic permanent magnet is formed in such a manner as to form a magnetic leakage-path breaking air gap portion 50 between the main magnetic pole 30 and an adjacently disposed auxiliary pole 4 over a radial direction from the vicinity of a substantially radially central portion of the main magnetic pole 30 to the inner circumferential end of the yoke 2. The outer circumferential length b of the air gap portion 50 is designed to be larger than the radial distance a of an air gap formed between the rotor 7 and the stator 1. A nonmagnetic member 60 made of a resin mold is provided in each air gap portion 50 and fixed to the inner circumferential surface of the yoke 2 through an adhesive or the like.

In this embodiment, although each magnetic leakage-path breaking air gap portion 50 is formed so as to extend from the substantially radially central portion of the main magnetic pole 30 to the outer circumference of the main magnetic pole 30, the anisotropic permanent magnet constituting the main magnetic pole 30 has the boundary between an N-pole and an S-pole at the radially central portion, so that the magnetic leakage-path breaking air gap portion 50 has the magnetic leakage-path breaking function substantially similarly to the first embodiment described above. Further, the main magnetic pole 30 can be surely circumferentially positioned by means of the nonmagnetic member 60.

Figure 8:
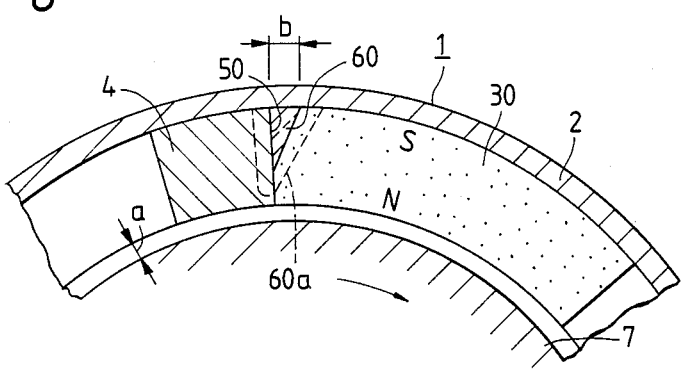
FIG. 8 is a sectional view showing a third embodiment of the permanent magnetic DC machine according to the present invention.
Figure 9:
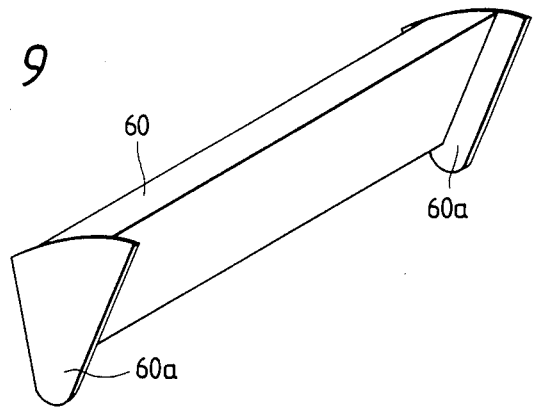
FIG. 9 is a perspective view showing the nonmagnetic member in the embodiment of FIG. 8.

FIGS. 8 and 9 illustrate a third embodiment of the present invention. In this embodiment, guides 60a are formed at the axially opposite ends of each nonmagnetic member 60 so that the guides 60a can receive the respective end surfaces of the main magnetic pole 30 and the auxiliary magnetic pole 4 in pair so as to axially position the main and auxiliary magnetic poles 30 and 4 in pair surely and properly. Thus, the assembling work is made further easy.

Figure 10:
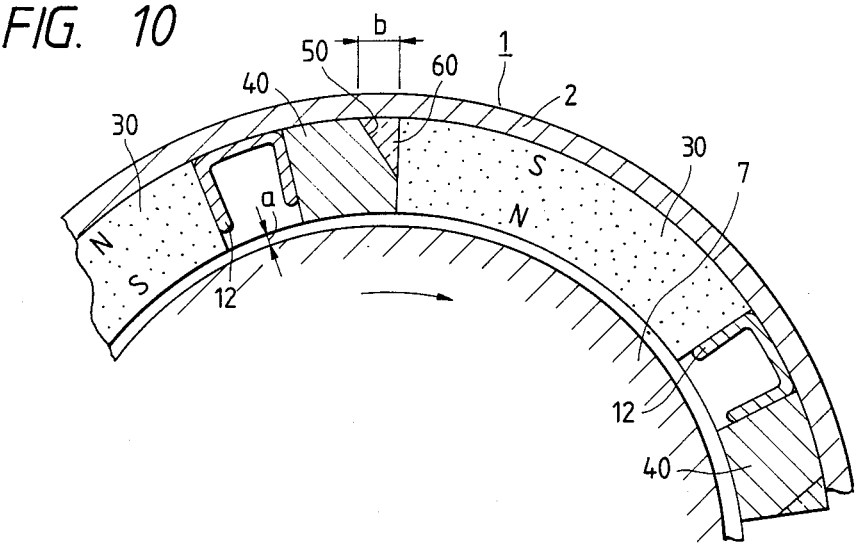
FIG. 10 is a sectional view showing a fourth embodiment of the permanent magnet DC machine of the present invention.

FIG. 10 illustrates a fourth embodiment of the present invention. In this embodiment, pairs of main and auxiliary magnetic poles 30 and 40 of the stator 1 are arranged on the inner circumferential surface of the yoke 2 at regular circumferential intervals, and an elastic body 12 such as a plate spring or the like is provided in each of the circumferential intervals between the pairs of main and auxiliary magnetic poles 30 and 40, so that it is made further sure to circumferentially position the main magnetic pole 30 and the auxiliary magnetic pole 40. In this embodiment of FIG. 10, the provision of the elastic bodies 12 makes it unnecessary to make firm the means for bonding each pair of the main and auxiliary magnetic poles 30 and 40 to the yoke 2. Further, a slot portion is formed in each auxiliary magnetic pole 40 so as to form a magnetic leakage-path breaking air gap portion 50.

As described above, according to the present invention, each pair of a main magnetic pole of anisotropic permanent magnet and an auxiliary magnetic pole of material having higher reversible permeability than that of the permanent magnet, are arranged so as to be circumferentially in contact with each other at the radially inner portion of the stator and so as to be circumferentially separated from each other at the radially outer side thereof to form a magnetic leakage-path breaking air gap portion therebetween. Further, the circumferential length of the magnetic leakage-path breaking air gap portion at the inner circumferential surface of the yoke is larger than the radial distance of an air gap between the stator and the rotor and a nonmagnetic member is provided in the magnetic leakage-path breaking air gap portion. Accordingly, the magnetic leakage-path between the main and auxiliary magnetic poles is broken by the nonmagnetic member to thereby reduce leakage magnetic-flux and improve rotary torque.

Further, since the main and auxiliary magnetic poles in each pair are made to be in contact with each other at the radially inner side of the stator, the magnetic-flux distribution waveform is smooth without dropping between the main and auxiliary magnetic poles in pair, so that the output can be improved and the generation of magnetic sound as well as mechanical vibrations can be prevented.

Still further, since the circumferential positioning of the main and auxiliary magnetic poles in each pair can be carried out by means of the guides provided at axially opposite end portions of the non-magnetic member, the assembling workability can be improved.

What is claimed is:

1. A permanent magnet DC machine comprising:
   a rotor;
   a stator diametrically opposed to the rotor through a fine air gap therebetween, wherein said stator comprises a yoke, main magnetic poles provided on an inner circumferential surface of said yoke and auxiliary magnetic poles provided respectively adjacent to said main magnetic poles side by side, each of said main magnetic poles being made of an anisotropic permanent magnet, and each of said auxiliary magnetic poles being made of a material having higher reversible permeability than that of said permanent magnet of said main magnetic poles, and wherein each pair of said main and auxiliary magnetic poles disposed adjacent to each other is arranged so that said each pair of main and auxiliary magnetic poles are in contact with each other at a radially inner portion of said magnetic poles and are separated from each other at a radially outer side of said magnetic poles to thereby form a magnetic leakage-path breaking air gap portion therebetween, said magnetic leakage-path breaking air gap portion being provided so that a circumferential length thereof at said radially outer side is larger than a radial distance of said fine air gap; and
   a nonmagnetic member provided in said magnetic leakage-path breaking air gap portion.

2. A permanent magnet DC machine according to claim 1, wherein said nonmagnetic member comprises a resin member.

3. A permanent magnet DC machine according to claim 1, wherein said nonmagnetic member has guides formed on axially opposite end portions thereof, each of said guides supporting end surfaces of said each pair of main and auxiliary magnetic poles to thereby dispose said main and auxiliary magnetic poles in position.

4. A permanent magnet DC machine according to claim 2, wherein said nonmagnetic member has guides formed on axially opposite end portions thereof, each of said guides supporting end surfaces of said each pair of main and auxiliary magnetic poles to thereby dispose said main and auxiliary magnetic poles in position.

5. A permanent magnet DC machine according to claim 1, wherein said radially inner port-ion is a radially inner side of said magnetic poles.

6. A permanent magnetic DC machine according to claim 1, wherein said radially inner portion extends from the vicinity of a substantially radially central portion of said magnetic poles to the radially inner side thereof.

7. A permanent magnet DC machine according to claim 1, further comprising elastic members each provided between the adjacent pairs of said main and auxiliary magnetic poles.

8. A permanent magnet DC machine according to claim 7, wherein each of said elastic members comprises a plate spring.

* * * * *